US012612022B2

(12) United States Patent
Zizer et al.

(10) Patent No.: US 12,612,022 B2
(45) Date of Patent: Apr. 28, 2026

(54) METHOD FOR OPERATING A MOTOR VEHICLE, DEVICE, AND MOTOR VEHICLE

(71) Applicant: Robert Bosch GmbH, Stuttgart (DE)

(72) Inventors: Artur Zizer, Heilbronn (DE); Franz Dahlke, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 339 days.

(21) Appl. No.: 17/996,818

(22) PCT Filed: May 6, 2021

(86) PCT No.: PCT/EP2021/061974

§ 371 (c)(1),
(2) Date: Oct. 21, 2022

(87) PCT Pub. No.: WO2021/228674

PCT Pub. Date: Nov. 18, 2021

(65) Prior Publication Data

US 2023/0202443 A1      Jun. 29, 2023

(30) Foreign Application Priority Data

May 15, 2020    (DE) ..................... 10 2020 206 139.4

(51) Int. Cl.
*B60T 13/66*        (2006.01)
*B60T 1/10*        (2006.01)

(52) U.S. Cl.
CPC .............. *B60T 13/662* (2013.01); *B60T 1/10* (2013.01); *B60T 2270/604* (2013.01)

(58) Field of Classification Search
CPC ..... B60T 13/662; B60T 1/10; B60T 2270/604
See application file for complete search history.

(56) References Cited

U.S. PATENT DOCUMENTS

| | | | |
|---|---|---|---|
| 2008/0189020 A1* | 8/2008 | Kudo ................... | B60T 8/4872 |
| | | | 701/70 |
| 2011/0132702 A1* | 6/2011 | Epple .................. | B60T 8/3275 |
| | | | 188/106 P |
| 2017/0297547 A1* | 10/2017 | Goto ........................ | B60T 8/00 |

FOREIGN PATENT DOCUMENTS

| | | |
|---|---|---|
| CN | 103025588 A | 4/2013 |
| CN | 106256624 A | 12/2016 |

(Continued)

OTHER PUBLICATIONS

International Search Report for PCT/EP2021/061974, Issued Jul. 21, 2021.

*Primary Examiner* — Steven Vu Nguyen
(74) *Attorney, Agent, or Firm* — NORTON ROSE FULBRIGHT US LLP

(57) ABSTRACT

A method for operating a motor vehicle. The motor vehicle includes a first actuating element, an actuatable second actuating element, and a braking system including an activatable braking force generator and a master brake cylinder, at least one hydraulic piston displaceably mounted in the master brake cylinder and is steplessly displaceable between first and second end positions. A first deceleration value is predefined for the motor vehicle when the instantaneous position of the piston falls short of a change position between the first and second ends. The braking force generator, when the first deceleration value is predefined, is activated in such a way that the hydraulic piston is displaced as a function of a level of the first deceleration value. The first deceleration value is decreased upon detection of the actuation of the second actuating element by the driver.

7 Claims, 3 Drawing Sheets

(56) References Cited

FOREIGN PATENT DOCUMENTS

| | | | |
|---|---|---|---|
| CN | 109996708 | A | 7/2019 |
| DE | 102015000594 | A1 | 7/2016 |
| DE | 112016003027 | T5 | 3/2018 |
| DE | 202019102503 | U1 | 5/2019 |
| DE | 102019006392 | A1 | 3/2020 |
| JP | 2006137324 | A | 6/2006 |
| JP | 2015063202 | A | 4/2015 |
| JP | 2017165151 | A | 9/2017 |
| JP | 2020067041 | A | 4/2020 |
| JP | 2021024332 | A | 2/2021 |
| JP | 2022155157 | A | 10/2022 |
| WO | 2019151208 | A1 | 8/2019 |

* cited by examiner

METHOD FOR OPERATING A MOTOR VEHICLE, DEVICE, AND MOTOR VEHICLE

FIELD

The present invention relates to a method for operating a motor vehicle, the motor vehicle including a first actuating element, an actuatable second actuating element, and a braking system including an activatable braking force generator and a master brake cylinder, at least one hydraulic piston being displaceably mounted in the master brake cylinder, the first actuating element being, in particular steplessly, displaceable between a first end position and a second end position, a change position being predefined between the end positions, an acceleration value for the motor vehicle being predefined when an instantaneous position of the actuating element exceeds the change position, a first deceleration value being predefined for the motor vehicle when the instantaneous position falls short of the change position, the braking force generator being activated, when the first deceleration value is predefined, in such a way that the hydraulic piston is displaced as a function of a level of the first deceleration value, and the hydraulic piston being displaced during an actuation of the second actuating element by a driver of the motor vehicle.

The present invention also relates to a device for operating a motor vehicle, using a control unit.

The present invention furthermore relates to a motor vehicle including such a device.

BACKGROUND INFORMATION

Methods and motor vehicles of the general type mentioned above are described in the related art. Motor vehicles usually include a hydraulic braking system including a master brake cylinder in which at least one hydraulic piston is displaceably mounted. When the hydraulic piston is displaced, a deceleration torque decelerating the motor vehicle is generated. An activatable electromechanical braking force generator is installed in braking systems to an increasing extent. Such a braking force generator includes an electric motor, which is coupled by a gearbox device to the hydraulic piston in such a way that the hydraulic piston is displaceable by the electric motor.

In particular, motor vehicles including an electrical driving machine moreover increasingly include a first actuating element having a so-called single-pedal function. An acceleration or a deceleration is selectively predefinable for the motor vehicle by such an actuating element. The first actuating element is displaceable between a first end position and a second end position, a change position being predefined between the end positions. An instantaneous position of the first actuating element is monitored for operating the motor vehicle with the aid of the first actuating element. In the process, an acceleration value is predefined for the motor vehicle when the instantaneous position of the first actuating element exceeds the change position. If the instantaneous position of the first actuating element falls short of the change position, a first deceleration value is predefined for the motor vehicle. The above-described single-pedal function is also referred to as one-pedal driving (OPD). If the motor vehicle includes both a first actuating element having a single-pedal function and a braking system including an activatable braking force generator, the braking force generator or the electric motor of the braking force generator, when the first deceleration value is predefined, is usually activated in such a way that the hydraulic piston is displaced as a function of a level of the first deceleration value. In the process, an extent of the displacement of the hydraulic piston corresponds to an extent of the deceleration of the motor vehicle.

Moreover, motor vehicles usually include an actuatable second actuating element, such as, for example, a brake pedal, the hydraulic piston being displaced during an actuation of the second actuating element by a driver of the motor vehicle. For actuating the second actuating element, the driver has to overcome a counter force opposing the actuation. The counter force is described by a deceleration-counter force characteristic curve, which describes the deceleration of the motor vehicle as a function of the counter force.

If no first actuating element having a single-pedal function is present, the deceleration-counter force characteristic curve usually has a characteristic profile. The driver is used to this profile. If the driver would like to increase the deceleration of the motor vehicle, he or she, for example, has to overcome a certain first counter force for actuating the previously unactuated second actuating element.

However, if a first actuating element having a single-pedal function is also present, the braking force generator, as described above, when the first deceleration value is predefined, is activated in such a way that the hydraulic piston is displaced. In the process, the deceleration of the motor vehicle corresponds to the extent of the displacement of the hydraulic piston. If the driver now would like to increase the deceleration of the motor vehicle by actuating the previously unactuated second actuating element, he or she has to overcome a counter force for this purpose, which is greater than the first counter force. This results from the fact that the hydraulic piston has already been displaced, and the motor vehicle is already being decelerated. This is unusual, and thus undesirable, for the driver.

SUMMARY

A method according to an example embodiment of the present invention may achieve that the counter force, which the driver has to overcome for increasing the deceleration of the motor vehicle, at least essentially corresponds to the expected counter force. For this purpose, in the method according to an example embodiment of the present invention, the first deceleration value is decreased upon detection of the actuation of the second actuating element by the driver. Thus, if it is detected that the driver actuates the second actuating element, the first deceleration value is decreased. Due to the decrease of the first deceleration value, the deceleration of the motor vehicle is also at least temporarily decreased. Accordingly, the counter force is decreased, which the driver has to overcome to increase the deceleration of the motor vehicle again by actuation of the second actuating element. The second actuating element is preferably, in particular steplessly, displaceable between a third end position and a fourth end position. The counter force is preferably provided by a spring unit, which is compressed during the actuation of the second actuating element by the driver. The spring unit thus urges the second actuating element in the direction of the third end position and, in particular, into the third end position. If the driver does not provide an actuating force counteracting the counter force, the second actuating element is in an unactuated state. An actuation of the second actuating element shall be understood to mean that the driver provides an actuating force acting on the second actuating element, as a result of which the position of the second actuating element is displaced in the direction of the fourth end position, compared to the position which the second actuating element assumes in the unactuated state. The position of the second actuating element is preferably not influenced by the activation of the braking force generator. In the unactuated state, the position of the second actuating element then corresponds to the third end position. The second actuating element thus remains in the third end position when the braking force generator is activated in such a way that the hydraulic piston is displaced. As an alternative, the second actuating element is coupled to the hydraulic piston and/or to a displaceably mounted actuating element of the braking force generator in such a way that the position of the second actuating element is changed by the activation of the braking force generator. For example, the second actuating element is displaced in the direction of the fourth end position when the braking force generator is activated in such a way that the hydraulic piston is displaced. Accordingly, the position of the second actuating element is variable in the unactuated state and is influenced by the first deceleration value, and thus the activation of the braking force generator or the extent of the displacement of the hydraulic piston.

According to a preferred specific embodiment of the present invention, it is provided that a second deceleration value is predefined during the actuation of the second actuating element, the braking force generator, when the second deceleration value is predefined, being activated in such a way that the hydraulic piston is displaced as a function of a level of the second deceleration value. During the actuation of the second actuating element, the hydraulic piston is thus at least displaced with the aid of the braking force generator. As an alternative or in addition, a mechanical coupling is present between the second actuating element and the hydraulic piston, so that the hydraulic piston is displaced during the actuation of the second actuating element due to the mechanical coupling. The level of the second deceleration value preferably corresponds to an extent of the actuation of the second actuating element in such a way that the second deceleration value is increased in the event of an increase in the extent of the actuation. As was described above, a decrease in the deceleration of the motor vehicle is at least temporarily effectuated by the decrease of the first deceleration value. If the second deceleration value is predefined during the actuation of the second actuating element, the temporary decrease in the deceleration is preferably achieved in that the first deceleration value is decreased more strongly than the second deceleration value is increased. As an alternative or in addition, the decrease of the deceleration of the motor vehicle is preferably achieved in that, adjoining the third end position, a slow-down area is predefined, no second deceleration value or a second deceleration value of zero being predefined when the position of the second actuating element is in the slow-down area.

According to one preferred specific embodiment of the present invention, it is provided that the first deceleration value is continuously changed as a function of an extent of the actuation of the second actuating element. Such a change of the first deceleration value is particularly comfortable for the driver. A discontinuous or incremental change of the first deceleration value, in contrast, could impair the comfort. The first deceleration value is preferably increased again when the extent of the actuation of the second actuating element is decreased.

The first deceleration value is preferably decreased immediately upon detection of the actuation of the second actuating element. The first deceleration value is thus decreased as quickly as possible. Since the first deceleration value is immediately decreased, a state is rapidly achieved starting at which the increase in the counter force, as desired, is accompanied by an increase in the deceleration of the motor vehicle.

The first deceleration value is preferably decreased independently of a displacement of the first actuating element. If the second actuating element is actuated, the first deceleration value is thus also decreased when the position of the first actuating element is not changed or remains constant.

According to one preferred specific embodiment of the present invention, it is provided that the braking system includes at least one friction braking unit, the master brake cylinder being fluidically connected to a slave cylinder of the friction braking unit, so that the friction braking unit is actuated during the displacement of the hydraulic piston. The motor vehicle is thus decelerated due to the actuation of the friction braking unit. This may be carried out in a particularly simple technical manner.

According to a preferred specific embodiment of the present invention, it is provided that the motor vehicle includes at least one electric machine, the electric machine being operated as a generator as a function of an extent of the displacement of the hydraulic piston. The deceleration of the motor vehicle is achieved by operating the electric machine as a generator. A hydraulic fluid, which is transported out of the master brake cylinder during the displacement of the hydraulic piston, is preferably transported into at least one low-pressure fluid reservoir fluidically connected to the master brake cylinder. In this way, an actuation of the friction braking unit is decreased or prevented.

A device according to the present invention for operating a motor vehicle, which includes a first actuating element which is, in particular steplessly, displaceable between a first end position and a second end position, an actuatable second actuating element, and a braking system including a braking force generator and a master brake cylinder, at least one hydraulic piston being displaceably mounted in the master brake cylinder, includes a control unit which is specifically configured to carry out the method according to the present invention when used as intended. This also results in the aforementioned advantages. Further preferred features and feature combinations result from what was described above and from the rest of the disclosure herein.

The motor vehicle according to the present invention includes a first actuating element, which is, in particular steplessly, displaceable between a first end position and a second end position, an actuatable second actuating element, and a braking system, the braking system including an activatable braking force generator and a master brake cylinder, in which at least one hydraulic piston is displaceably mounted. The motor vehicle according to an example embodiment of the present invention includes the device according to the present invention. This also results in the aforementioned advantages. Further preferred features and feature combinations result from features disclosed herein.

The present invention is explained in greater detail hereafter based on the figures.

DETAILED DESCRIPTION OF EXAMPLE EMBODIMENTS

Figure 1:
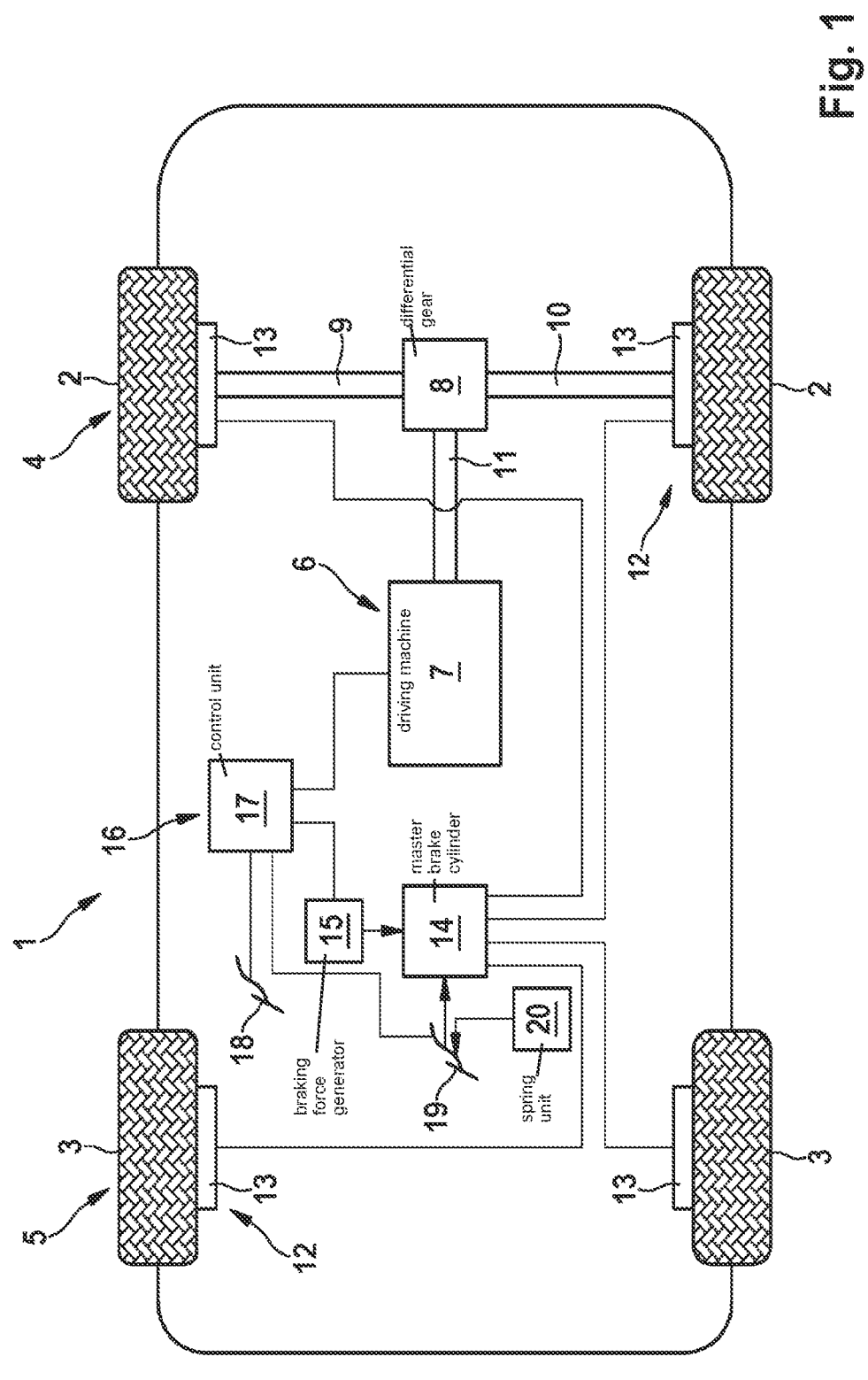
FIG. 1 shows a motor vehicle in a simplified illustration, according to an example embodiment of the present invention.

FIG. 1 shows a motor vehicle 1 in a simplified illustration. In the present example, motor vehicle 1 includes four wheels 2 and 3, wheels 2 being assigned to a front axle 4 and wheels 3 being assigned to a rear axle 5. Motor vehicle 1 furthermore includes a drive system 6 including a driving machine 7, which in the present example is an electrical driving machine 7 operable as a generator. Driving machine 7 is connected by a differential gear 8 and shafts 9, 10 and 11 to wheels 2 of front axle 4, so that wheels 2 are drivable by driving machine 7.

Motor vehicle 1 furthermore includes a braking system 12. Braking system 12 includes four friction braking units 13, each of wheels 2 and 3 being assigned a different one of friction braking units 13. For actuating friction braking units 13, braking system 12 includes a master brake cylinder 14, which in the present example is designed as a tandem master brake cylinder 14 so that two hydraulic pistons, which are not shown, are displaceably mounted in master brake cylinder 14. Master brake cylinder 14 is fluidically connected to slave cylinders of friction braking units 13.

A braking force generator 15 is assigned to master brake cylinder 14. Braking force generator 15 includes an activatable electric motor. The electric motor is coupled to the hydraulic pistons in such a way that the hydraulic pistons are displaced during an activation of the electric motor.

Motor vehicle 1 furthermore includes a device 16 including a control unit 17. Control unit 17 is communicatively connected to driving machine 7 and designed to activate driving machine 7. Moreover, control unit 17 is communicatively connected to braking force generator 15 and configured to activate braking force generator 15 or the electric motor of braking force generator 15.

Motor vehicle 1 furthermore includes a first actuating element 18. First actuating element 18 is designed as a pedal and is steplessly displaceable between a first end position and a second end position. The position of first actuating element 18 in the first end position corresponds to a percentage value of 0% based on the actuating travel from the first end position to the second end position. In the second end position, the position of first actuating element 18 corresponds to a percentage value of 100%. First actuating element 18 is communicatively connected to control unit 17 so that the instantaneous position of first actuating element 18 is provided to control unit 17. Control unit 17 predefines a virtual change position situated between the end position of first actuating element 18.

If the position of first actuating element 18 exceeds the change position, control unit 17 predefines an acceleration value for motor vehicle 1. The instantaneous position of first actuating element 18 is then in an acceleration range situated between the change position and the second end position. When the acceleration value is predefined, control unit 17 activates driving machine 7 in such a way that motor vehicle 1 is accelerated.

If the position of first actuating element 18 falls short of the change position, control unit 17 predefines a first deceleration value for motor vehicle 1. The instantaneous position is then in a deceleration range situated between the first end position and the change position. When the first deceleration value for motor vehicle 1 is predefined, control unit 17 activates braking force generator 15 in such a way that the hydraulic pistons are displaced as a function of a level of the first deceleration value. When the first deceleration value increases, an extent of the displacement of the hydraulic pistons also increases.

When the hydraulic pistons are displaced, motor vehicle 1 is decelerated, an extent of the deceleration of motor vehicle 1 corresponding to the extent of the displacement of the hydraulic pistons. A hydraulic fluid is transported out of master brake cylinder 14 as a result of the displacement of the hydraulic pistons. Motor vehicle 1 is preferably decelerated by an actuation of friction braking units 13. For this purpose, the hydraulic fluid is transported into the slave cylinders. As an alternative, motor vehicle 1 is preferably decelerated by driving machine 7 being operated as a generator. In this case, the hydraulic fluid is transported into at least one low-pressure fluid reservoir, which is not shown, to prevent the actuation of friction braking units 13.

Motor vehicle 1 furthermore includes a second actuating element 19, which is a brake pedal 19. Brake pedal 19 is steplessly displaceable between a third end position and a fourth end position. The position of brake pedal 19 in the third end position corresponds to a percentage value of 0% based on the actuating travel from the third end position to the fourth end position. In the fourth end position, the position of brake pedal 19 corresponds to a percentage value of 100%.

A spring unit 20 is assigned to brake pedal 19, which urges brake pedal 19 in the direction of the third end position and, in particular, into the third end position. Brake pedal 19 is accordingly displaceable against a spring force of spring unit 20 in the direction of the fourth end position, so that the spring force represents a counter force which has to be overcome to displace brake pedal 19 in the direction of the fourth end position. Spring unit 20 is held preloaded between brake pedal 19 on the one hand and a housing, which is not shown, in particular, a housing of braking force generator 15, on the other hand. Spring unit 20 is accordingly supported, directly or indirectly, at brake pedal 19 on the one hand and, directly or indirectly, at the housing on the other hand.

Brake pedal 19 is actuatable by a driver of motor vehicle 1. An actuation of brake pedal 19 shall be understood to mean that the driver applies an actuating force on the brake pedal 19 in such a way that brake pedal 19 is displaced in the direction of the fourth end position, compared to the position which brake pedal 19 assumes in the unactuated state.

In the present example, brake pedal 19 is mechanically coupled to the hydraulic pistons in such a way that the hydraulic pistons are displaced as a result of the mechanical coupling when brake pedal 19 is actuated. According to one further exemplary embodiment, such a mechanical coupling between brake pedal 19 and the hydraulic pistons is dispensed with.

In the present example, brake pedal 19 is coupled to a displaceably mounted actuating element of braking force generator 15 in such a way that brake pedal 19 is displaced in the direction of the fourth end position when braking force generator 15 is activated in such a way that the hydraulic pistons are displaced. Accordingly, the position of brake pedal 19 is variable in the unactuated state and is influenced by the level of the first deceleration value, and thus the activation of braking force generator 19 or the extent of the displacement of the hydraulic pistons.

Brake pedal 19 is communicatively connected to control unit 17 so that the extent of the actuation of brake pedal 19 or the instantaneous position of brake pedal 19 is provided to control unit 17. When brake pedal 19 is actuated, control unit 17 predefines a second deceleration value for motor vehicle 1. When the second deceleration value for motor vehicle 1 is predefined, control unit 17 activates braking force generator 15 in such a way that the hydraulic pistons are displaced as a function of a level of the second deceleration value. When the second deceleration value increases, an extent of the displacement of the hydraulic pistons also increases.

Figure 2:
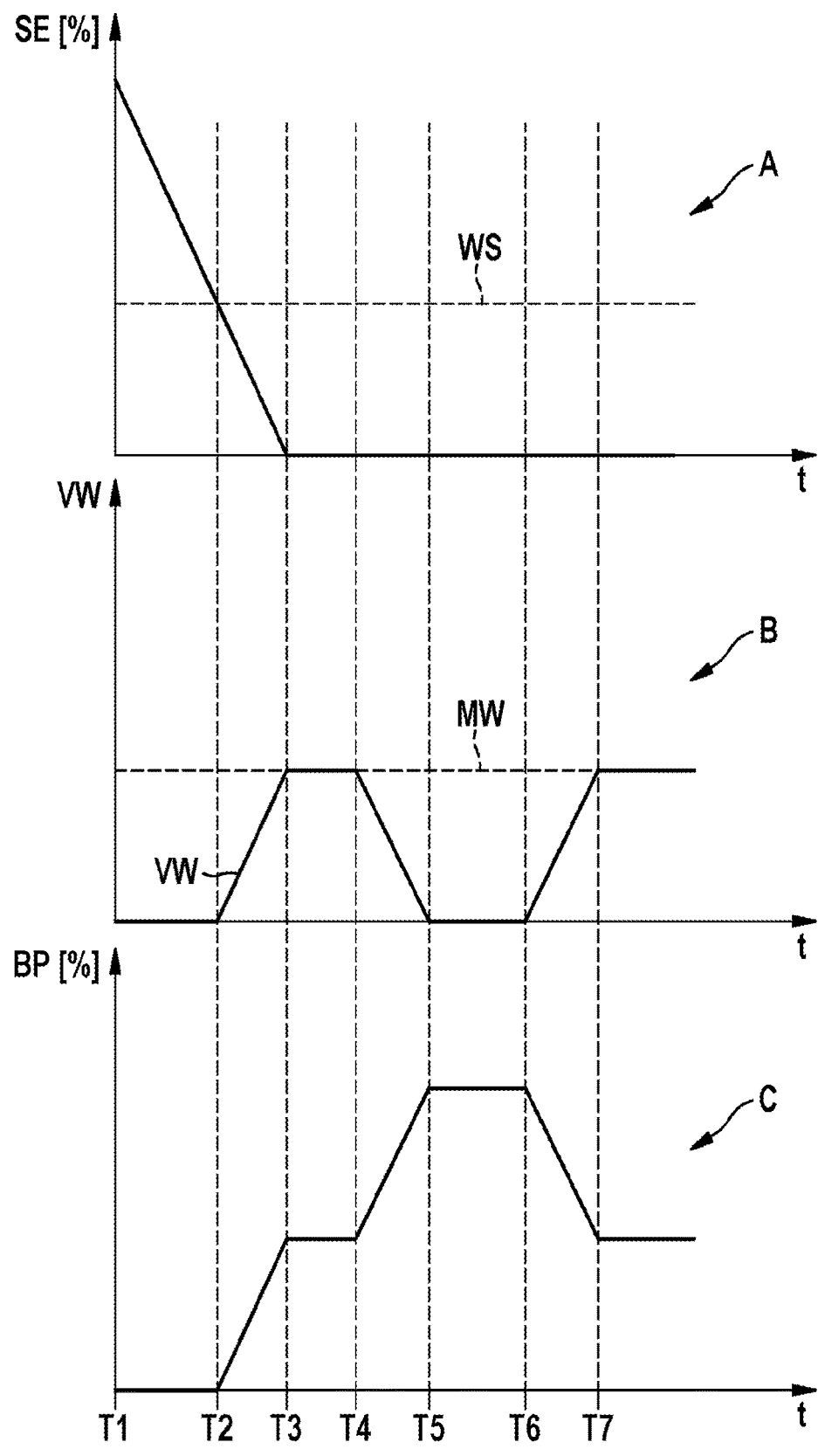
FIG. 2 shows a method for operating the motor vehicle, according to an example embodiment of the present invention.

An advantageous method for operating motor vehicle 1 is described hereafter with reference to FIG. 2. In this regard, FIG. 2 shows a first diagram A, a second diagram B, and a third diagram C.

First diagram A shows the percentage value of the position of first actuating element 18 as a function of time t. Second diagram B shows first deceleration value VW as a function of time t. Third diagram C shows the percentage value of the position of brake pedal 19.

The position of first actuating element 18 is in the acceleration range between first point in time T1 and a second point in time T2. Accordingly, no first deceleration value VW is predefined between points in time T1 and T2. The position of brake pedal 19 corresponds to the third end position.

Proceeding from change position WS, first actuating element 18 is displaced into the first end position between second point in time T2 and a third point in time T3 so that, at third point in time T3, the position of first actuating element 18 corresponds to the first end position. The position of first actuating element 18 is kept constant hereafter. Since the position of first actuating element 18 between points in time T2 and T3 is in the deceleration range, control unit 17 predefines first deceleration value VW. Due to the displacement of first actuating element 18 into the first end position, the level of first deceleration value VW is continuously increased between points in time T2 and T3 until the level of the first deceleration value has reached a maximum value MW. Due to first deceleration value VW being predefined, control unit 17, starting at second point in time T2, controls braking force generator 15 in such a way that braking force generator 15 displaces the hydraulic pistons. In the process, the extent of the displacement of the hydraulic pistons corresponds to the level of first deceleration value VW. When first deceleration value VW is increased, the extent of the displacement of the hydraulic pistons also increases. Due to brake pedal 19 being coupled to the hydraulic pistons and/or the actuating element of braking force generator 15, brake pedal 19 is displaced in the direction of the fourth end position. In the process, no actuating force is provided by the driver. In this respect, brake pedal 19 is in the unactuated state between points in time T2 and T3.

Starting at a fourth point in time T4, brake pedal 19 is actuated by the driver. The driver thus provides an actuating force which exceeds the counter force so that brake pedal 19 is displaced by the driver in the direction of the fourth end position. Between fourth point in time T4 and a fifth point in time T5, brake pedal 19 is continuously displaced in the direction of the fourth end position so that the percentage value of the position of brake pedal 19 increases continuously. The actuation of brake pedal 19 is detected by control unit 17. As a result, control unit 17 continuously decreases the level of first deceleration value VW between points in time T4 and T5.

Starting at a sixth point in time T6, the extent of the actuation of brake pedal 19 is decreased. Brake pedal 19 is thus displaced in the direction of the third end position again by the counter force until brake pedal 19, at a seventh point in time T7, is in the unactuated state again. The decrease of the actuation of brake pedal 19 is detected by control unit 17. As a result, control unit 17 continuously increases the level of first deceleration value VW between points in time T6 and T7.

Since brake pedal 19 is actuated between points in time T4 and T7, control unit 17 also predefines the second deceleration value between these points in time. The profile of the second deceleration value, however, is not shown in FIG. 2 for the sake of clarity.

Figure 3:
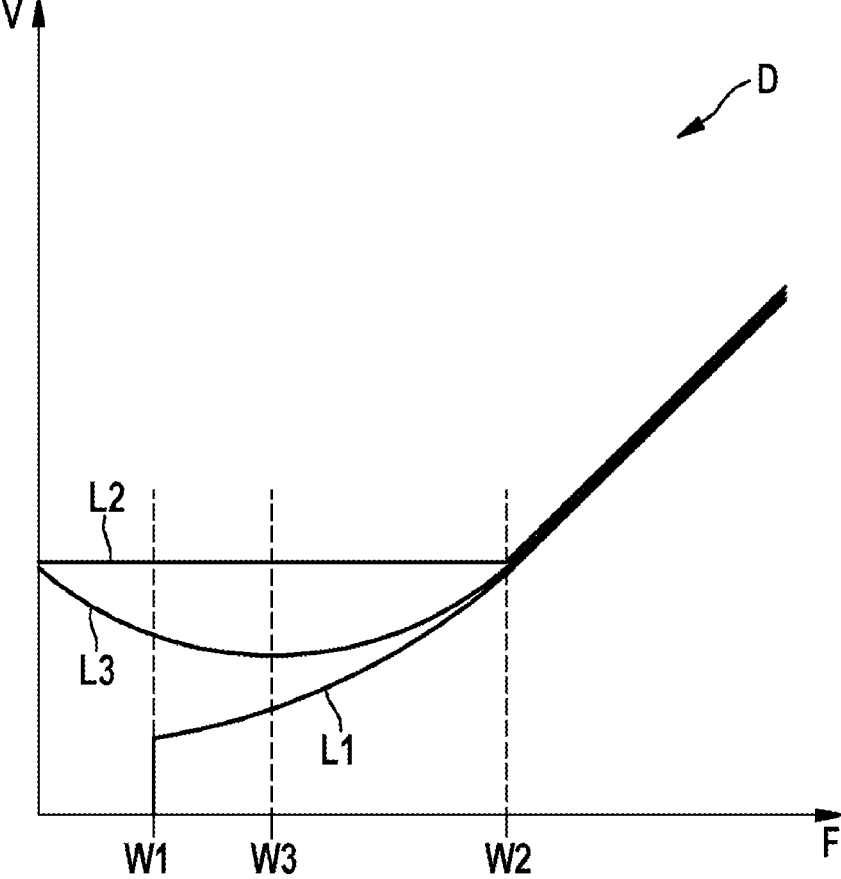
FIG. 3 shows a deceleration-counter force characteristic curve, according to an example embodiment of the present invention.

FIG. 3 shows a fourth diagram D in which different deceleration-counter force characteristic curves are shown. A deceleration-counter force characteristic curve is a characteristic curve which describes deceleration V of motor vehicle 1 as a function of counter force F provided by spring unit 20.

A first deceleration-counter force characteristic curve L1 describes the deceleration of motor vehicle 1 as a function of counter force F provided by spring unit 20 in the case of inactivity of the single-pedal function of first actuating element 18 or in the absence of a first actuating element including a single-pedal function. When the single-pedal function is inactive, an acceleration value is always predefined during the actuation of first actuating element 18, as is the case with conventional gas pedals. As is apparent from FIG. 3, the driver, proceeding from the previously unactuated second actuating element 19, has to overcome a counter force having a certain first value W1 to increase the deceleration of motor vehicle 1.

A second deceleration-counter force characteristic curve L2 describes deceleration V of motor vehicle 1 as a function of counter force F provided by spring unit 20 in the case of activity of the single-pedal function of first actuating element 18. The position of first actuating element 18 is in the deceleration range. In this respect, first deceleration value VW is predefined, and motor vehicle 1 is decelerated. If first deceleration value VW is not decreased during the actuation of brake pedal 19, the driver has to overcome a counter force having a certain second value W2 to increase deceleration V of motor vehicle 1, as is apparent from characteristic curve L2. Value W2 is considerably higher than value W1. For the driver, it is unusual to have to overcome such a high counter force F to increase deceleration V of motor vehicle 1.

A third deceleration-counter force characteristic curve L3 also describes deceleration V of motor vehicle 1 as a function of the provided counter force F in the case of activity of the single-pedal function of first actuating element 18. In the case of third deceleration-counter force characteristic curve L3 as well, the position of first actuating element 18 is in the deceleration range, so that first deceleration value VW is predefined, and motor vehicle 1 is decelerated. However, if the driver overcomes counter force F, and thus actuates brake pedal 19, first deceleration value VW is decreased, as is described above with reference to FIG. 2. As a result, deceleration V of motor vehicle 1 is also temporarily decreased. The driver therefore only has to overcome a counter force having a certain third value W3, which is between first value W1 and second value W2, to increase deceleration V of motor vehicle 1. When the driver overcomes the counter force having value W2, the increase of the second deceleration value outweighs the decrease of the first deceleration value VW, so that deceleration V of the vehicle overall increases. Since third value W3 is lower than second value W2, the driver perceives the actuation of brake pedal 19 according to third characteristic curve L3 to be more pleasant than the actuation of brake pedal 19 according to second characteristic curve L2.

What is claimed is:

1. A method for operating a motor vehicle, the motor vehicle including a first actuating element, an actuatable second actuating element, and a braking system including an activatable braking force generator and a master brake cylinder, at least one hydraulic piston being displaceably mounted in the master brake cylinder, the first actuating element being steplessly displaceable between a first end position and a second end position, a change position being predefined between the end positions, an acceleration value for the motor vehicle being predefined when an instantaneous position of the first actuating element exceeds the change position, the method comprising:

predefining a first deceleration value for the motor vehicle when the instantaneous position of the first actuating element falls short of the change position;

activating the braking force generator, when the first deceleration value is predefined, in such a way that the hydraulic piston is displaced as a function of a level of the first deceleration value;

displacing the hydraulic piston during an actuation of the second actuating element by a driver of the motor vehicle; and decreasing the first deceleration value upon detection of the actuation of the second actuating element by the driver, wherein between the first end position and the change position the first actuating element is in an acceleration range, and wherein between the change position and the second end position the first actuating element is in a deceleration range.

2. The method as recited in claim 1, wherein a second deceleration value is predefined during the actuation of the second actuating element, the braking force generator, when the second deceleration value is predefined, is activated in such a way that the hydraulic piston is displaced as a function of a level of the second deceleration value.

3. The method as recited in claim 1, wherein the first deceleration value is continuously changed as a function of an extent of the actuation of the second actuating element.

4. The method as recited in claim 1, wherein the first deceleration value is decreased immediately upon detection of the actuation of the second actuating element.

5. The method as recited in claim 1, wherein the first deceleration value is decreased independently of a displacement of the first actuating element.

6. The method as recited in claim 1, wherein the braking system includes at least one friction braking unit, the master brake cylinder being fluidically connected to a slave cylinder of the friction braking unit so that the friction braking unit is actuated during the displacement of the hydraulic piston.

7. The method as recited in claim 1, wherein the motor vehicle includes at least one electric machine, the electric machine being operated as a generator as a function of an extent of the displacement of the hydraulic piston.

* * * * *